US012644846B2

(12) United States Patent
Deng et al.

(10) Patent No.: US 12,644,846 B2
(45) Date of Patent: Jun. 2, 2026

(54) LIGHT-BASED INSPECTION TOOLS FOR THE INSPECTION OF THE INTERNAL SURFACE OF A CYLINDRICAL STRUCTURE

(71) Applicant: Board of Trustees of Michigan State University, East Lansing, MI (US)

(72) Inventors: Yiming Deng, Okemos, MI (US); Mohand Alzuhiri, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 137 days.

(21) Appl. No.: 18/238,502

(22) Filed: Aug. 27, 2023

(65) Prior Publication Data

US 2024/0077426 A1      Mar. 7, 2024

Related U.S. Application Data

(60) Provisional application No. 63/401,862, filed on Aug. 29, 2022.

(51) Int. Cl.
*G01N 21/88* (2006.01)

(52) U.S. Cl.
CPC ................................. *G01N 21/8806* (2013.01)

(58) Field of Classification Search
CPC ............... G01N 21/88; G01N 21/8806; G01N 21/8851; G01N 21/954; G01N 2021/9544; G01N 2021/9548
See application file for complete search history.

(56) References Cited

U.S. PATENT DOCUMENTS

| | | | | | |
|---|---|---|---|---|---|
| 4,195,529 A | * | 4/1980 | Madoian | .............. | G01N 27/902 |
| | | | | | 376/245 |
| 2012/0188353 A1 | * | 7/2012 | Schick | ............... | G02B 23/2461 |
| | | | | | 348/E7.085 |

OTHER PUBLICATIONS

Jason Geng. Structured-light 3D surface imaging: a tutorial. *IEEE Intelligent Transportation System Society,*, 2011.
Li Zhang, Brian Curless, and SM Steven M SM Seitz. Rapid shape acquisition using color structured light and multi-pass dynamic programming. *3D Data Processing*, 2002.
Christoph Schmalz, Frank Forster, Anton Schick, Elli Angelopoulou, Frank Forster, Anton Schick, and Elli Angelopoulou. An endoscopic 3D scanner based on structured light. *Medical Image Analysis*, 2012.
Mohand Alzuhiri. *Multi-Modality Nondestructive Evaluation Techniques for Inspection of Plastic and Composite Pipeline Networks*. PhD thesis, Michigan State University, 2022.
Beiwen Li, Yajun Wang, Junfei Dai, William Lohry, and Song Zhang. Some recent advances on superfast 3D shape measurement with digital binary defocusing techniques. *Optics and Lasers in Engineering*, 2014.
Joaquim Salvi, Sergio Fernandez, Tomislav Pribanic, and Xavier Llado. A state of the art in structured light patterns for surface profilometry. *Pattern Recognition*, 2010.

(Continued)

*Primary Examiner* — Kevin K Pyo

(74) *Attorney, Agent, or Firm* — Harness, Dickey & Pierce, P.L.C.

(57) ABSTRACT

An inspection tool includes a projector projecting a projected pattern on a cylindrical surface, a first camera generating a first image of the projected pattern and a controller generating a surface profile of the cylindrical surface based on the first image.

18 Claims, 13 Drawing Sheets

(56) References Cited

OTHER PUBLICATIONS

Hong Guo. *3-D shape measurement based on Fourier transform and phase shifting method.* PhD thesis, Stony Brook University, 2011.

Katherine Creath. Error sources in phase-measuring interferometry. In *Intl Symp on Optical Fabrication, Testing, and Surface Evaluation*, 2017.

Peisen S. Huang. High-speed 3-D shape measurement based on digital fringe projection. *Optical Engineering*, 2003.

Qingde Li and J.G. Griffiths. Least squares ellipsoid specific fitting. In *Geometric Modeling and Processing, 2004. Proceedings*, 2004.

DA Turner, IJ Anderson, JC Mason, and MG Cox. An algorithm for fitting an ellipsoid to data. *National Physical Laboratory*, UK, 1999.

* cited by examiner

10<sup>c</sup>

P

C1

C2

36

40

42R

42B 42G  44  42B  42G  42R  44

LIGHT-BASED INSPECTION TOOLS FOR THE INSPECTION OF THE INTERNAL SURFACE OF A CYLINDRICAL STRUCTURE

CROSS-REFERENCE TO RELATED APPLICATION

This application claims the benefit of U.S. Provisional Application No. 63/401,862, filed on Aug. 29, 2022. The entire disclosure of the above application is incorporated herein by reference.

GOVERNMENT RIGHTS

This invention was made with government support under awarded 693JK31850007CAAP by the U.S. Department of Transportation. The government has certain rights in the invention.

FIELD

The present disclosure relates to generally to inspection tools and, more specifically light-based inspection tools suitable for inspecting cylindrical structures.

BACKGROUND

This section provides background information related to the present disclosure which is not necessarily prior art.

The extensive adoption of plastic pipelines is a growing phenomenon in different fields of the industry, with applications that extend from municipal water and sewer systems to the water lines in nuclear reactors. The large-scale adoption is motivated by the unique features of plastics like corrosion and chemical resistance, low cost, and design flexibility. While the dielectric nature of plastic pipelines provides unique design capabilities, it also introduces new challenges for the operators when it comes to inspecting and ensuring the integrity of these pipelines' networks.

The majority of premature failures in plastic pipelines are due to brittle and slow crack growth (SCG) through the pipe wall. Major drivers of premature failure due to slow crack growth can be related to bending stresses due to tight bend radii impingement, internal defects, welded joints, and fittings. Identification and classification of the current vintage pipeline inner wall damage precursors are of critical importance, but one of the challenges of inspecting MDPE pipelines is the dielectric nature of their wall material. Most of the mature pipe inspection techniques have been designed and well developed to inspect metal pipelines and cannot be used to inspect polymer-based gas pipelines. Internal inspection techniques such as Eddy Current Magnetic Flux Leakage (MFL) sensors require either highly conductive or ferromagnetic pipe walls. Ultrasound techniques require a coupling medium with the inner pipe wall for an efficient inspection, which is hard to achieve in the case of natural gas distribution networks. Hybrid methods like electromagnetic acoustic transducers (EMAT) require the existence of both ferromagnetic walls and an acoustic coupling medium.

Pipe joints are used frequently to create long pipe sections, with butt-fusion being the most commonly used method. Butt-fusion involves the simultaneous heating of the ends of two pipes which are to be joined until a molten state is attained on each contact surface. The two surfaces are then brought together under controlled pressure for a specific cooling time, and a homogeneous fusion joint is formed. The quality of a joint is affected by many factors that include, but are not limited to, the welding temperature, the melting point of the plastic, contamination, and welding pressure. Concerns arise from the fact that there are currently no reliable NDE methods to evaluate the integrity of those joints. The current weld inspection procedures and guidelines depend mainly on visual inspection. Although visual inspection has proven to be a successful method for the inspection of PE butt-fusion welds, several limitations remain. There are cases where the joints pass all the visual inspection guidelines and still fail due to contamination or low tie molecule density. There is little evidence that current NDE methods can reliably detect the low bonding strength across the joint interface. Results in this field and reported research efforts typically focus on the detection of artificially produced volumetric defects to identify poor fusions; however, a recent study has indicated that there is no evidence suggesting these volumetric defects influence the strength of the joints.

The high efficiency and eco-friendly trenchless installations are widely used to build an extensive network of gas pipelines. However, unintentional drilling of new pipelines through legacy utility using trenchless drilling technologies creates an intersection named cross-bore. A cross bore in a gas pipeline happens when a gas pipeline passes through a sewer pipe during the drilling process. Cross-bores involving sewer lateral and gas pipes, with an estimated average rate of 0.4 per mile of gas pipeline, are significant threats to the safety of the general public and utility workers, with several incidents being reported due to the cutting through of the gas pipe by drain cleaners. Recognizing the severity of the cross-bore hazard, various technologies such as cameras, acoustic pipe locators, and ground-penetrating radar are used to detect cross-bore but with limited efficiency. The LED-assisted camera is the primary technology that is used to detect and identifies cross-bore by deploying it into the sewer pipe; however, the camera is limited by the access to blocked and water and mud-filled sewer pipes.

SUMMARY

This section provides a general summary of the disclosure and is not a comprehensive disclosure of its full scope or all of its features.

The disclosure presents a set of 3D imaging structured light based tools that were designed for the inspection of the internal surfaces of cylindrical entities with potential application in the inspection of pipeline networks. Features of the disclosure include but are not limited to 1) A side-by-side SL sensor design with 360-degree unobstructed inspection capability, 2) A phase SL sensor with the capability to exploit the sensor movement to enhance the 3D reconstructed profile, 3) An algorithm to automatically calibrate the projection module when the sensor is placed inside a cylindrical environment with known diameter, 4) An electronic stabilization algorithm to register the consecutive frames from the SL sensor and reconstruct the pipe 3D profile. The system provides a multi-color or color-coded multi-ring pattern structured light pattern inspection, which integrates with RGB inspection simultaneously and seamlessly while maintaining a small sensor footprint to allow insertion in small diameter pipelines.

In one aspect of the disclosure, an inspection tool includes a projector projecting a projected pattern on a cylindrical surface, a first camera generating a first image of the projected pattern and a controller generating a surface profile of the cylindrical surface based on the first image.

In another aspect of the disclosure, a method of inspecting a cylindrical surface included projecting a projected pattern on a cylindrical surface, generating a first image of the projected pattern and generating a surface profile of the cylindrical surface based on the first image.

In yet another aspect of the disclosure, an inspection tool includes a base plate. A projector is mounted to the base plate and projects a projected pattern on a cylindrical surface. A first camera is mounted to the base plate and generates a first image of the projected pattern. A second camera is mounted to the base plate and generates a second image of the projected pattern. A controller generates a surface profile of the cylindrical surface based on the first image and the second image.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Referring now to FIGS. 1A-C and 2A-2B, a structured light (SL) based sensor 10 for the inspection of the internal surface of cylindrical structures is set forth. In this example, the sensor 10 is used for the internal inspection of a plastic gas pipe 12. The sensor 10 has the ability to reconstruct the 3D profile of the pipe internal surface and detect the existence of surface deformations and material loss defects. The sensor 10, in this example, is a single-shot SL sensor with a simple and small size setup that consists of only a single camera C and a slide projector P.

The camera C and projector P are separated by a predefined distance and placed in an orientation that enables them to share a similar baseline to simplify the triangulation process. The proposed schematic of the SL sensor 10 for cylindrical geometry is shown in FIG. 1A. The setup consists of the projection module or projector P, and the camera C that is positioned axially in front of the projection module P. The projector P and the camera C are held together with a transparent tube T. In FIG. 1A the sensor 10 has the camera C, the projector P and the transparent tube T aligned with the longitudinal axis 14 of the pipe 12. The camera C, the projector P and the tube T and are assumed to share the same main axis 16 to simplify the triangulation process, whether or not the main axis 16 is aligned with the longitudinal axis 14 of the pipe. By using symmetry around the main axis 16, the 3D triangulation can be reduced to 2D and the distance in the radial and axial directions can be calculated for each angle φ.

Figure 1B:
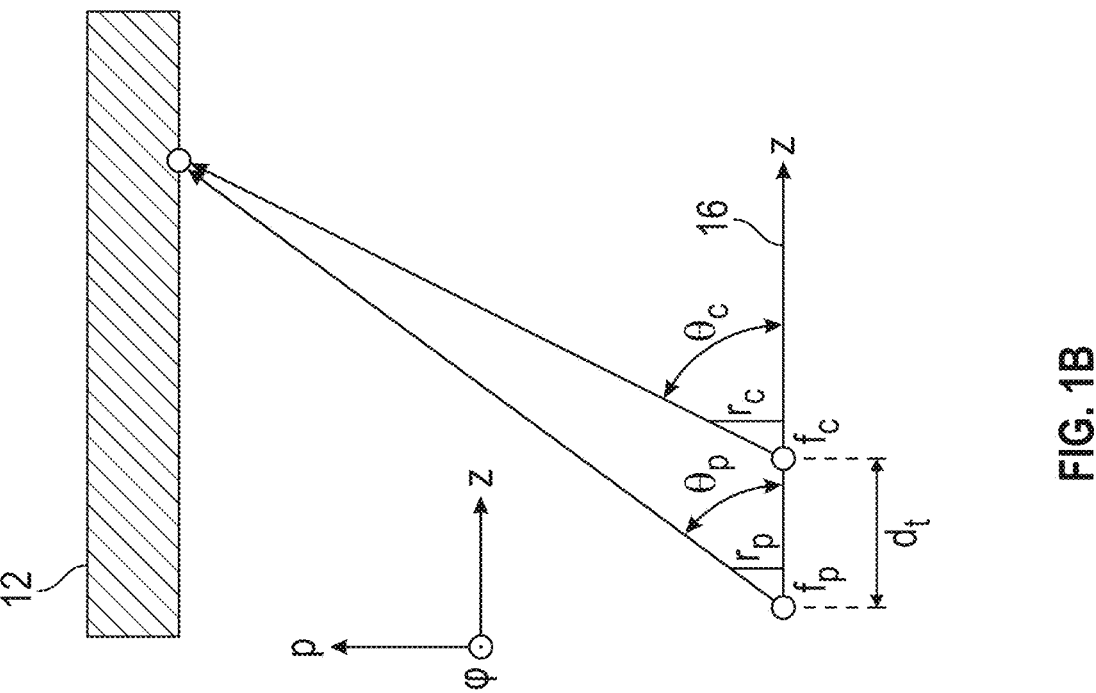
FIG. 1B is a plot of the geometry of the sensor of FIG. 1A.
Figure 1A:
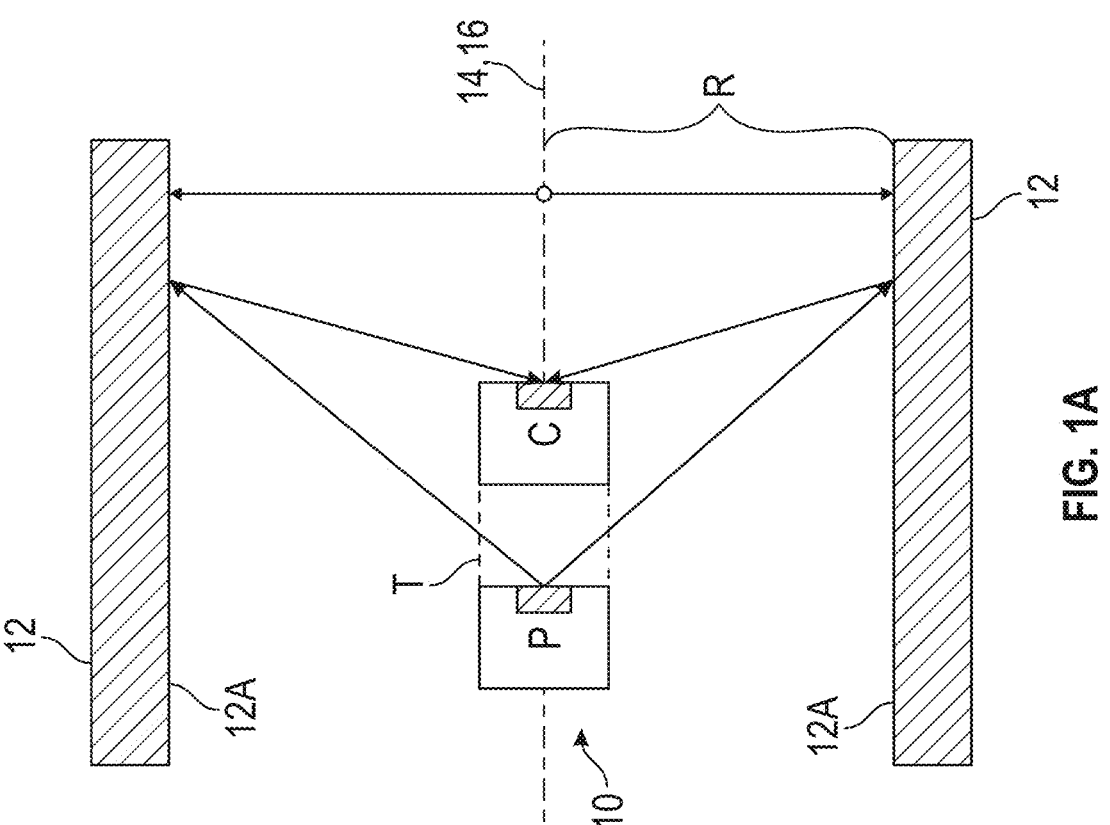
FIG. 1A is a cutaway view of a first configuration of a sensor within a pipe.

In FIG. 1B the triangulation process of the sensor 10 based on a pinhole camera model for both the projector and the camera. Where $f_c$ is the camera focal length, $f_p$ is the projector focal length, and d is the distance between the camera C and projector P. $r_c$ is the position of the point in the camera image coordinates, and $r_p$ is the position of the point in the projector image coordinates. By assuming equal focal lengths for the projector and the camera ($f=f_p=f_c$), the cylindrical coordinates of the 3D point are given by:

$$z = \frac{d}{1 - \frac{r_p}{r_c}}, \text{ and } p = \frac{r_p z}{f}.$$

These equations assume a single ring projection with a fixed projection focal length. The equations are generalized for multiple ring setup by having different $r_p$ values for each projected ring.

Figure 1C:
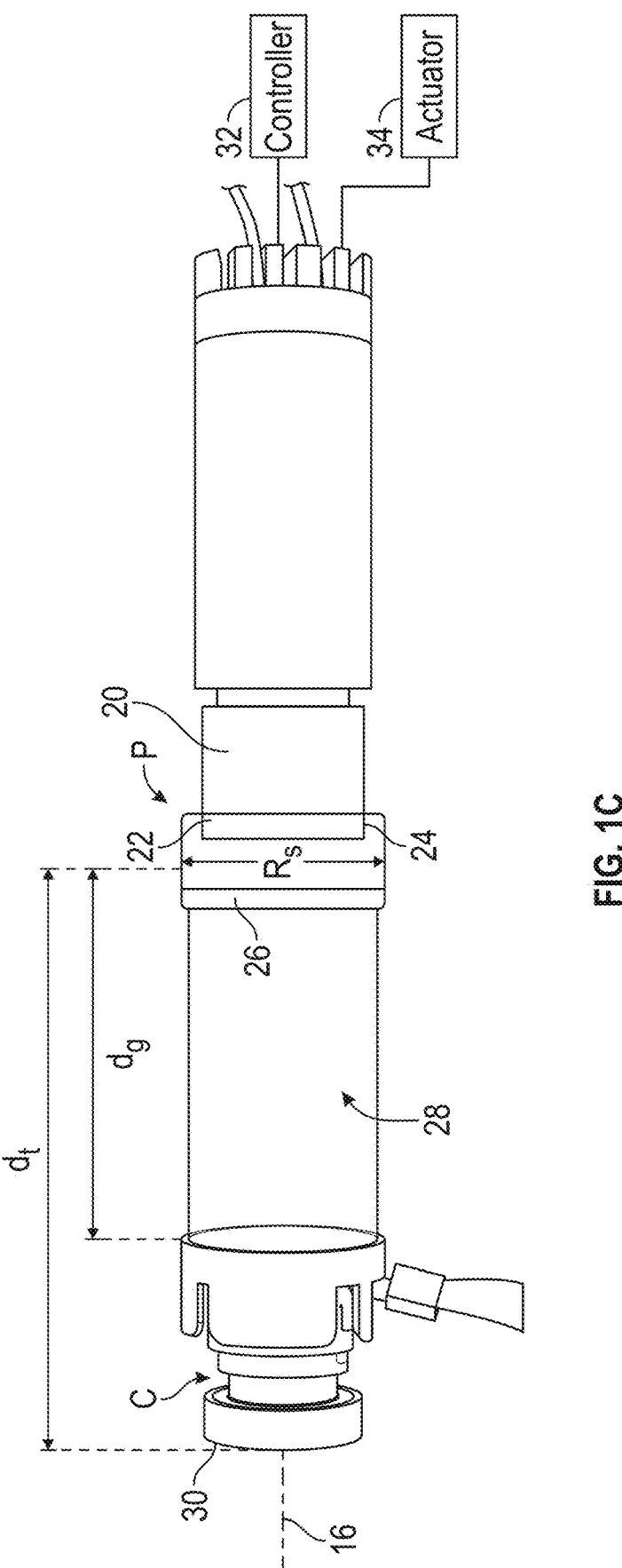
FIG. 1C is a detailed figure of the sensor of FIG. 1A.

As is best shown in FIG. 1C, the use of a static slide projector P reduces sensor complexity, size, and power consumption. The projector P may be scaled to have a diameter as small as 4 mm. The fabricated slide projector P consists of a high-intensity light-emitting diode (LED) 20, collimation lens 22, transparency slide 24, and projection lens 26. The high-intensity LED 20 is the main light source that illuminates the pattern. The diverging light rays from the LED are gathered and focused on the slide 24 via the collimating lens 22. The transparency slide 24 is used to filter or attenuate specific wavelengths of the white light according to the texture printed on the slide. In one example, the slide was directly printed with an inkjet printer on a transparency film. The projection lens is used to direct and focus the image of the pattern on the projection plane. A transparent glass tube 28 connects the camera C and the projector P to enable the projection of the colored rings to the wall of the pipe 12. In this example, a complementary metal-oxide-semiconductor (CMOS) camera was fitted with a wide-angle lens 30 to increase the field of view (FOV) and capture the projected rings. The distance $d_t$ between the camera C and the projector P is dependent on the projector P and the field of view of the camera C and the inspected pipe diameter. To ensure that the largest projected ring in the pattern is within the field of view of the camera C, the distance between the projector and the camera must satisfy:

$$d_t < \frac{R}{\tan(\theta_{pl}/2)} - \frac{R}{\tan\left(\frac{\theta_c}{2}\right)}, \tag{2}$$

where R is the radius of the inspected pipe, $\theta_{pl}$ is the projection angle of the outer edge of the ring, and $\theta_c$ is the viewing angle of the camera. To ensure that the smallest ring in the pattern is not blocked by the projector body, the projection angle of its inner edge ($\theta_{ps}$) must satisfy:

$$\theta_{ps} > 2\arctan\left(\frac{R_{sen}}{d_g}\right) \tag{3}$$

where $R_{sen}$ is the sensor radius and $d_g$ is the length of the transparent glass tube.

A controller 32 uses the data received from the camera or cameras C to determine a surface profile of a cylindrical pipe 12 and/or the presence of defects in the cylindrical inner surface 12A of the pipe 12.

An actuator 34 such as a robot, motor or the like may be used to move the sensor 10 within the pipe 12. Of course, the sensor may be moved manually.

Figures 1D, 2A:
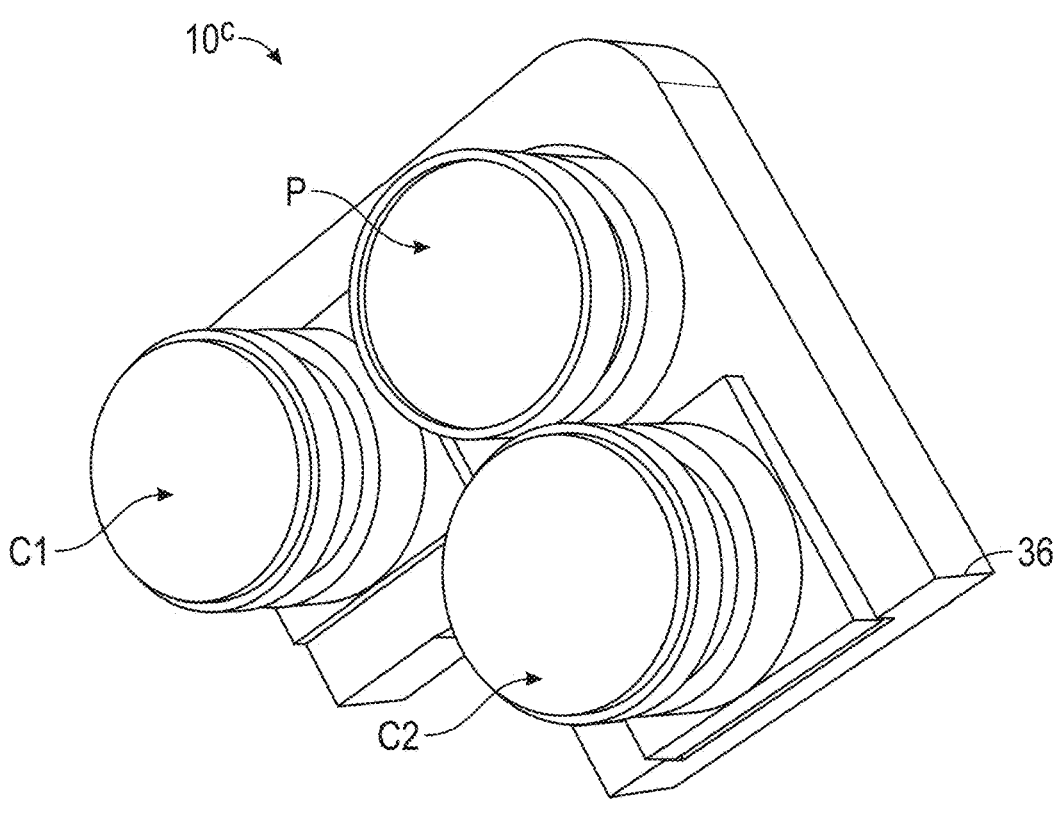
FIG. 1D is a perspective view a stereo sensor.
FIG. 2A is a portion of a pattern generated by a projector.
Figure 2B:
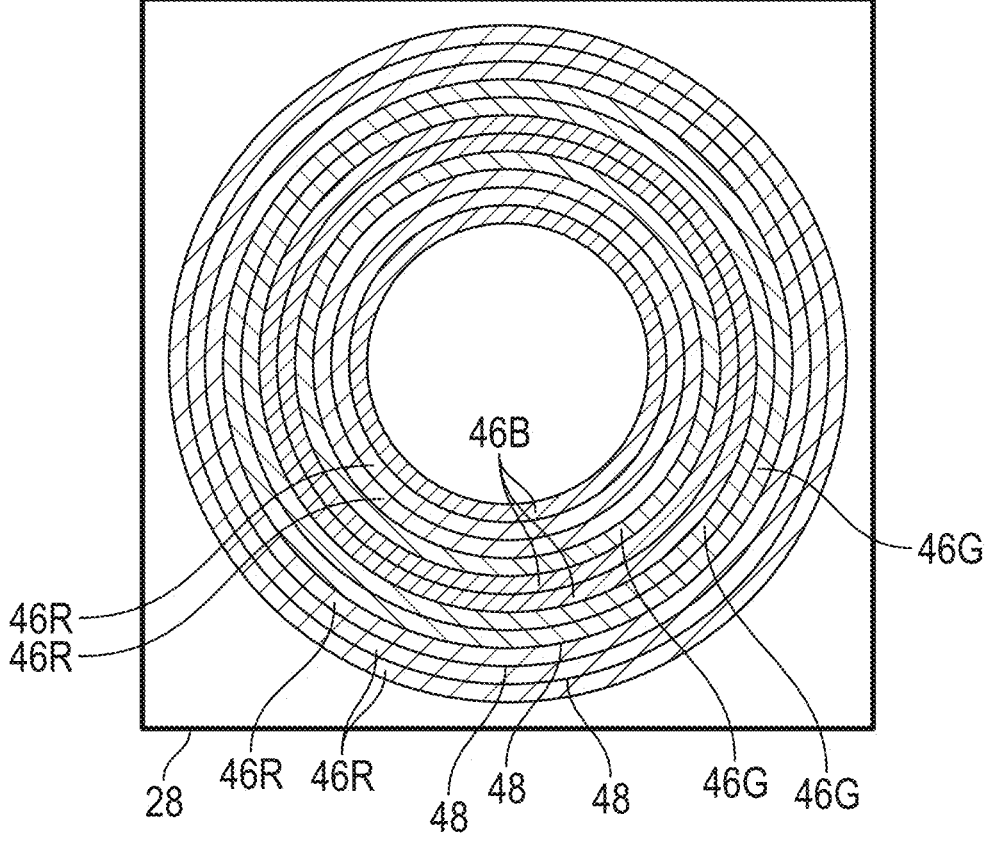
FIG. 2B is a slide having a circular pattern thereon.

Referring now also to FIGS. 2A and 2B a multi-color multi-ring projected pattern 40 is used to increase the robustness of the sensor and to compensate for the limited depth of field of the projector P. The pattern 40 represents a portion of the pattern that is projected within the pipe. As shown in FIG. 2A, a portion of the projected multi-ring pattern 40 generates a plurality of color portions having green color portions 42G, blue color portions 42B and red color portions 42B with spaced-apart black slits 44 between each color portion. In FIG. 2B, the slide 28 has multiple colored rings including red rings 46R, blue rings 46B and green rings 46G. Black rings 48 are spaces between the colored rings that are projected onto the interior of the pipe from the black slits 44. The multi-ring approach increases the number of 3D points acquired from each collected frame when compared to a single ring laser scanner. The increased number of data points is used in facilitating the registration and stabilization process since it provides a more complete presentation of the pipe shape from only a single shot. The structured light sensor 10 consists of the projection module P that projects a highly textured pattern and the camera C that captures the deformations in the projected pattern.

As is best illustrated in FIGS. 2A and 2B The pattern 40 was designed to be a sequence of color-changing stripes. Color coding is preferred over intensity coding because it increases the number of available codes and enhances robustness toward noise. It is worth noting that monochrome sensors can provide higher resolution and better low light capabilities due to the elimination of the Bayer filter and de-mosaicking process from the camera sensor. Each colored stripe is separated from its neighbor by a thin black slit to enhance the detectability of the edges during the decoding process. This approach also allows for the use of neighboring rings with the same colors which increases the number of available code words for a specific code word length. Initial experiments with direct color coding without the slits showed difficulty in reliably detecting the edges. This is due to the blurring effect from the shallow depth of field of the projection module. The final pattern was designed to have only three colors, red, green, and blue. The colors provide maximum separation in the RGB domain where they occupy three distinct corners. A De Bruijn sequence generator was used to generate a sequence of non-repeated code words. This scheme guarantees that a specific sequence with a length of n will occur only once in the generated sequence. A sequence with k characters and a code length of n can generate a code sequence of a length of $k^n$ stripes. Therefore, a projected pattern with three colors (red, green, blue), and a code length of three can generate $3^3$ stripes. The location of the stripe can be decoded if three correct consecutive colors are detected. In FIG. 2B, eleven concentric color-coded rings are illustrated.

Figure 2C:
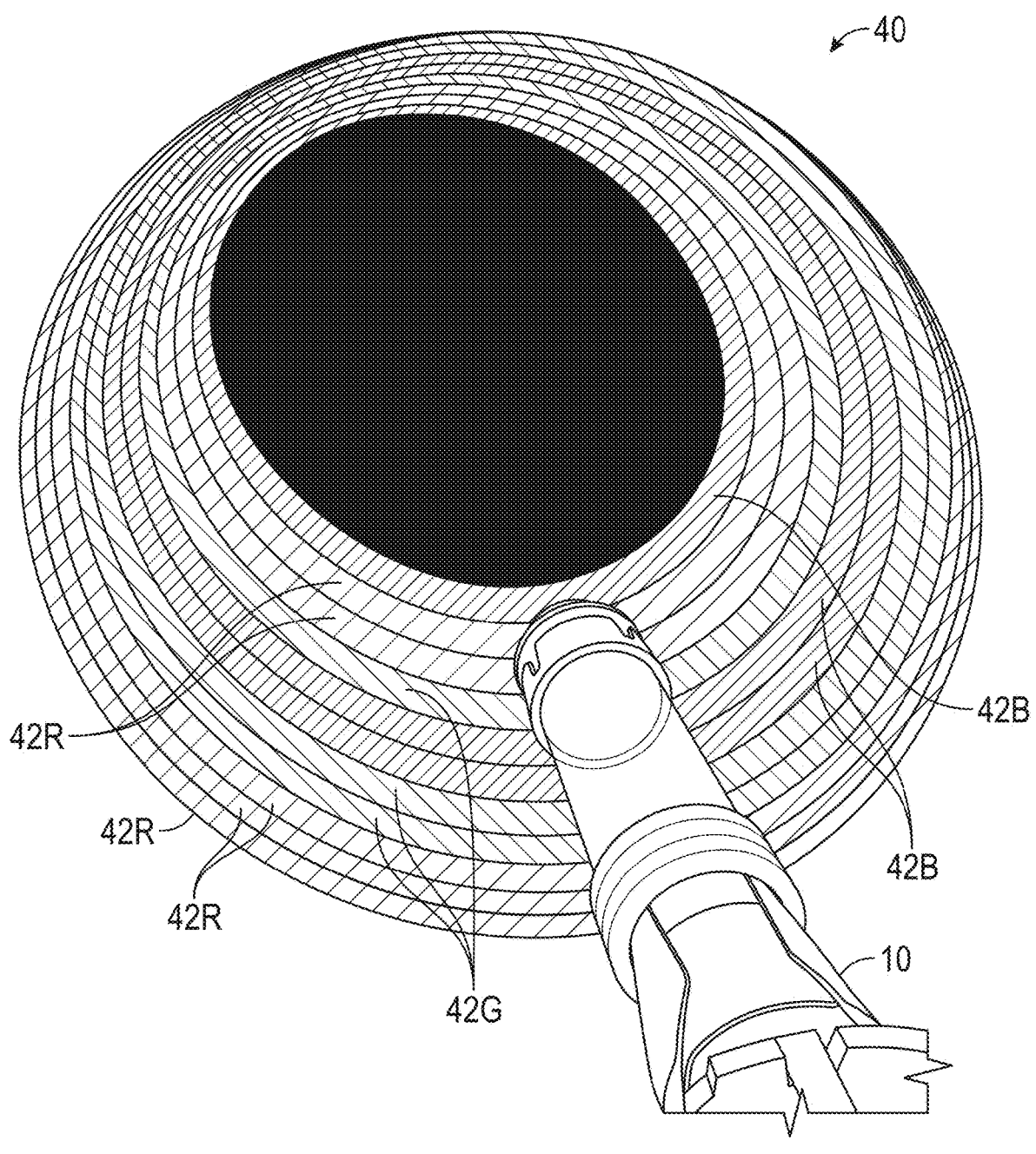
FIG. 2C is a perspective view of a projected pattern within a pipe.

FIG. 2C shows the multi-ring pattern 40 projected into a pipe 12 from a sensor 10.

Referring now to FIG. 1D, a stereo sensor 10' is illustrated. Sensor 10' has a stereo configuration that has a first camera C1, a second camera C2 and the projector P mounted on a base plate 36. The sensor 10' guarantees that there is at least one camera ray not tangential to the projected cone and enables full reconstruction of a cone surface described in more detail below.

By adding another camera C2, in an orientation parallel to the axis of the first camera C1 instability is addressed. The system configuration provides additional geometric constraints to stabilize the solution process and reduces the solution's ambiguity if one of the cameras has a tangential ray to the projected cone. The second camera orientation guarantees at least one camera ray at any time that is not tangential to the cone. A reconstruction algorithm is set forth that combines the data from both of the cameras to reconstruct the profile of the inspected surface.

Endoscopic structured light and laser sensor assume a conic projection of the SL and laser rings to illuminate the inspected surface and imaged by the sensor camera.

Figure 3A:
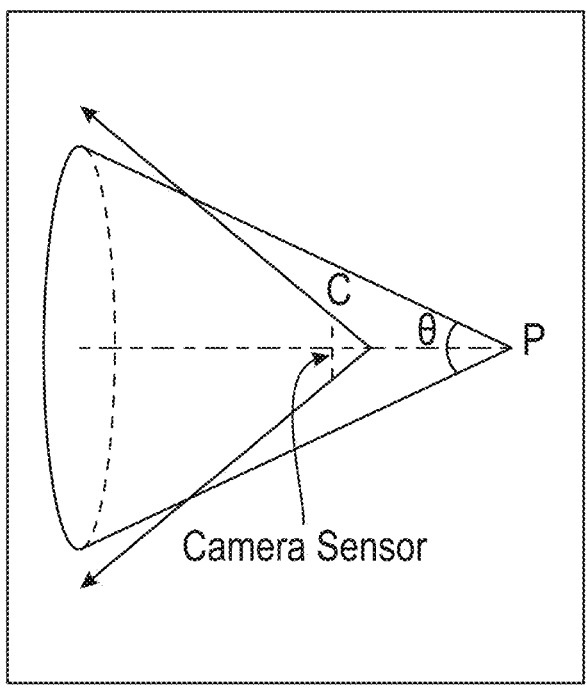
FIG. 3A is a plot of a triangulation technique in a sequential sensor.
Figure 3B:
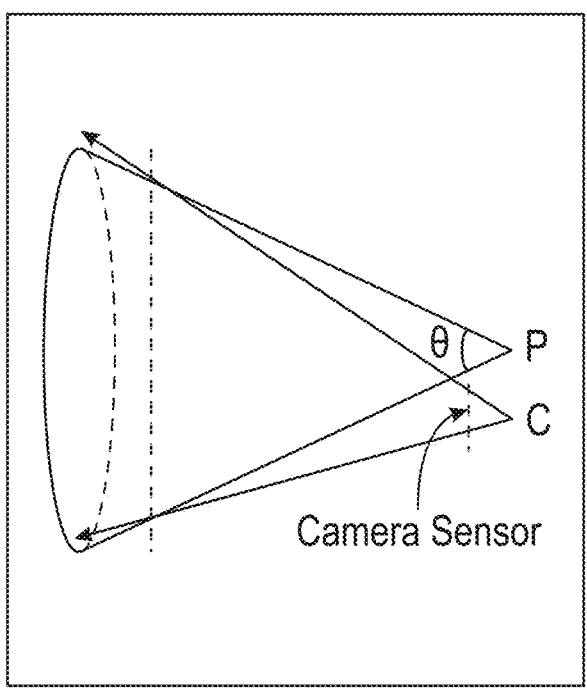
FIG. 3B is a triangulation plot for a stereo sensor.

In FIGS. 3A and 3B, a triangulation in sequential and side by side sensor configurations are shown.

P and C are the optical centers of the projector and camera, respectively. The inspected surface dimensions are found by calculating the intersection points between the camera rays and the projected cones. Every detected ring point in the camera image is associated with a ray (w) that intersects with the projected cone. For a general case, the position vector ($P_x$) of the intersection point ($P_x$) can be described by $$P_x = C + sw. \tag{4}$$

C is the camera optical center, and C is its position vector. Normal and bold fonts will be used to represent the point, and its position vector thought the report. The projected cone is described by $$\frac{P_x - P}{|P_x - P|} \cdot \Lambda = \cos\theta. \tag{5}$$

By combining Eq. 4 and Eq. 5 and simplifying the equations, the required parameters to solve the equation are given by $$a = (w \cdot A)^2 - \cos^2\theta, \qquad (6)$$

$$b = 2(w \cdot A)(PC \cdot A) - w \cdot PC^{\cos^2\theta}, \qquad (7)$$

$$c = (PC \cdot A)^2 - (PC \cdot PC)\cos^2\theta. \qquad (8)$$

The value of s can be calculated as:

$$s = \frac{-b \pm \sqrt{b^2 - 4ac}}{2a} \qquad (9)$$

The calculated value of s is substituted in Eq. 4 to calculate the position of the point of intersection. The intersection point can be tested according to the value of $\delta$, which is given by $$\delta - \sqrt{b^2 - 4ac} \qquad (10)$$

If $\delta < 0$, the ray has no intersection with the cone.

If $\delta = 0$, the ray intersects with the cone at only a single point.

If $\delta > 0$, the ray intersects with the cone at two points.

Figure 4A:
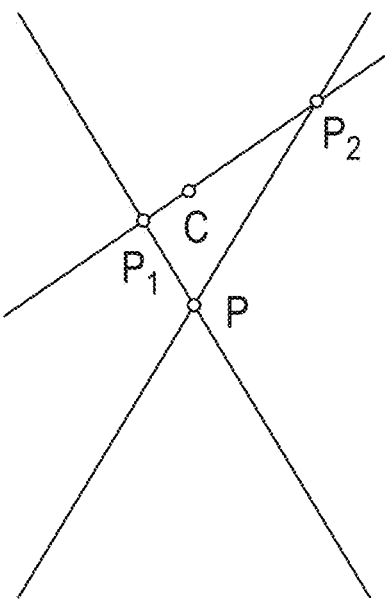
FIG. 4A is the intersection of a camera ray with a projected cone for a sequential sensor.
Figure 4B:
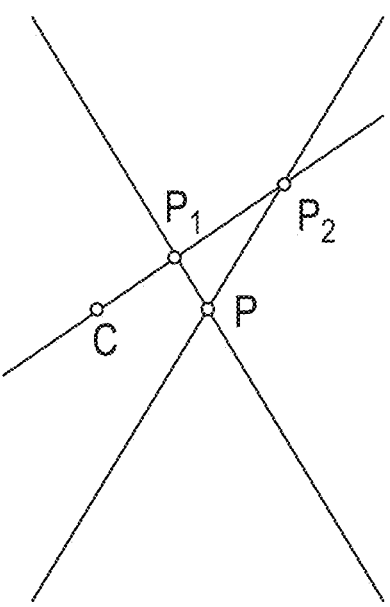
FIG. 4B is a ray diagram for a stereo sensor.

In FIGS. 4A and 4B, the intersection of the camera ray with the projected cone is illustrated as a concentric camera and projector and side by side camera and projector.

The lower value of $\delta$ indicates a lower possibility for the camera ray to intersect with the cone.

FIG. 4A shows the intersection of the camera rays with the projected cones. C and P are the optical centers of the camera and projector, respectively. For the sequential sensor where the camera is enclosed by the projected cone, the camera ray intersects twice with the conic surface as shown in FIG. 4A. One intersection point $P_2$ is in front of the camera C, and the other point $P_2$ is behind the camera C. The only valid intersection is the point in front of the camera $P_2$ since the camera is looking only in the forward direction.

In FIG. 4B, the side-by-side configuration, a similar procedure may be followed to find the intersections points when the intersecting ray is a nontangential ray to the cone. The main difference from the sequential sensor is that the camera ray intersections are both in front of the camera, as shown in FIG. 4B. The only valid solution is the farthest point from the camera $P_2$ because $P_1$ is a virtual point that cannot be seen by the camera.

Figures 5A, 5B:
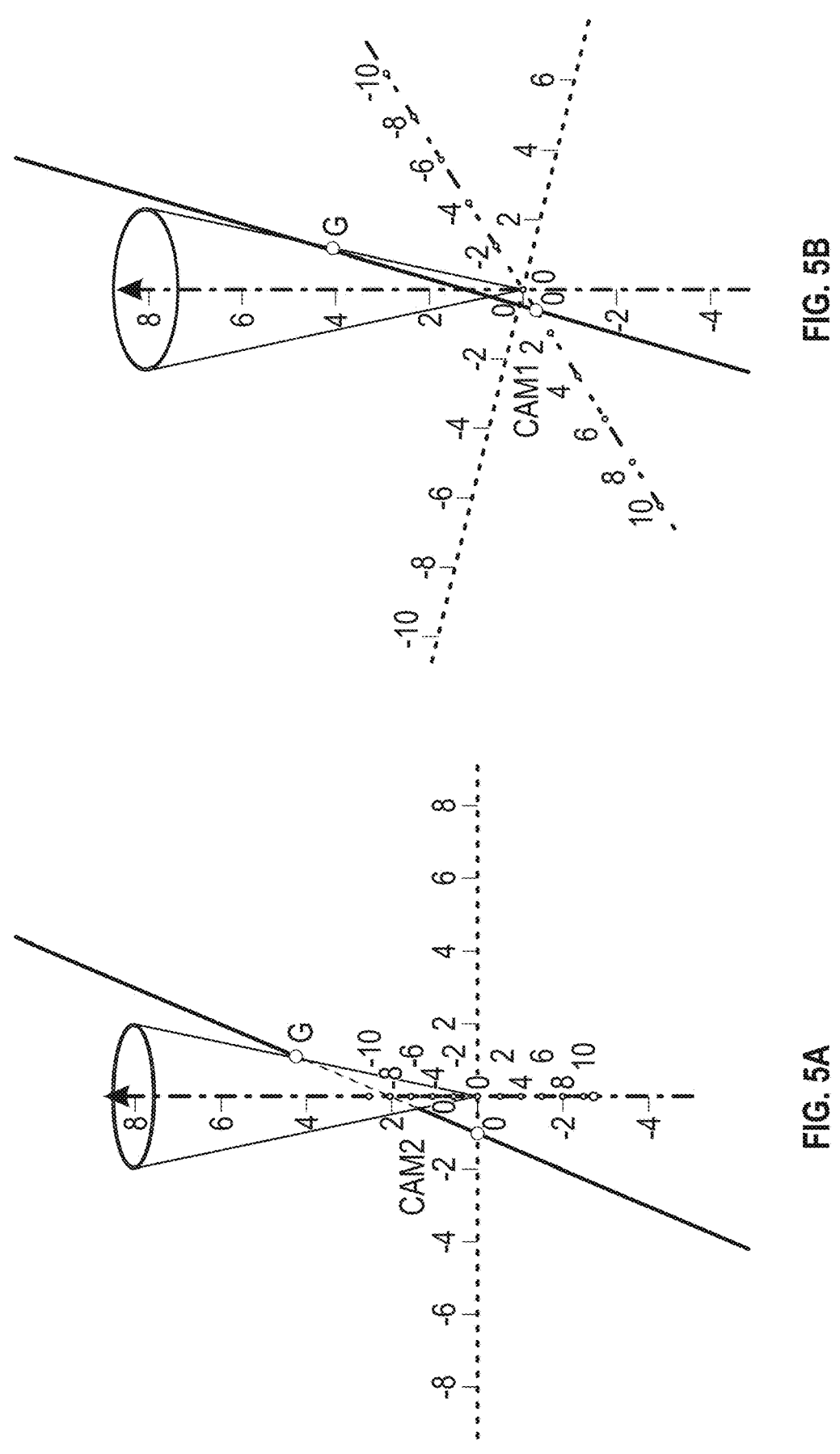
FIG. 5A is a plot of the intersection of a camera ray with a projected cone illustrating intersection at two points.
FIG. 5B is the intersection of the camera ray with the projected cone illustrated as intersecting at a single point.

Referring now to FIGS. 5A and 5B, the intersection of the camera ray with the projected cone is illustrated. In FIG. 5A the camera ray is in the same plane as the line connecting the camera and the projector and intersecting at two points. In FIG. 5B the camera ray is tangent to the projected cone and intersecting with it at a single point.

Aside from the General Solution, there are Two Special Cases:

Case 1: The camera ray is in the same plane as the vector connecting the camera and the projector as shown in FIG. 5A. This case is similar to the sensor triangulation of sequential sensors shown in FIG. 3A. In this case the triangulation is simplified from 3D to 2D and the intersection can be calculated with simple trigonometric formulations. The trigonometric formulations for each angle φ are described as follows:

$$\tan\theta_c = \frac{\rho}{Z}, \ \tan\theta_P = \frac{\rho}{d+Z}. \qquad (11)$$

$$Z = \frac{d\tan(\theta_P)}{\tan(\theta_c) - \tan(\theta_P)}, \ \rho = Z\tan(\theta_C). \qquad (12)$$

$\theta_P$ is the half projection angle $$\left(\theta_P = \frac{\theta}{2}\right).$$

$\theta_c$ is the angle of the camera ray, d is the distance between the projector and the camera. This case is valid in only two points, and they correspond to the two maxima of $\delta$; therefore, it is difficult to generalize the formulations to the other points in the cone.

Case 2: the camera ray is tangential to the cone and intersects with the cone at a single point, as shown in FIG. 5B. Theoretically, this case is only valid when the value of $\delta$ is equal to zero, which is represented by two lines on the projected cone. In practice, noise exists and causes deviation in the position of the camera ray and causes ambiguity in differentiating between the cases of intersection and no intersection in the vicinity of these points. Therefore, the reconstruction problem becomes ill-posed where any slight change in the direction of the camera ray can lead to a significant shift in the position of the intersection point. Therefore, the threshold for intersection is increased from zero to $\Delta$ to account for this ambiguity. $\Delta$ is a scalar with a value dependent on the noise level. The result is a partial reconstruction of the projected cone surface where only parts of the surface with $\delta$ values larger than $\Delta$ are reconstructable. In this invention, we use an additional camera to create a plane that is perpendicular to the original camera projector plane.

Figures 6, 7:
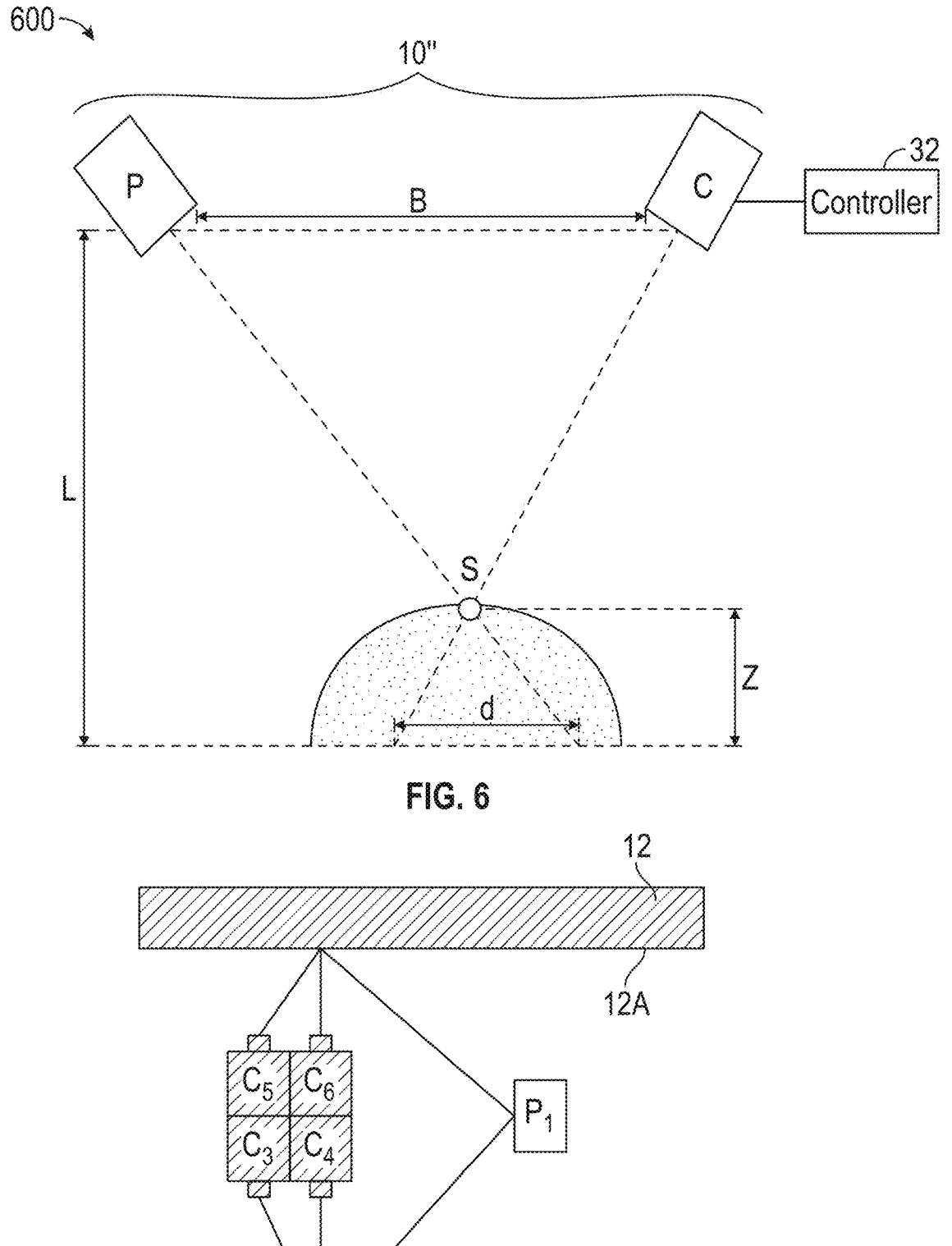
FIG. 6 is a plot of a movement enhanced phase measurement sensor relative to a projector.
FIG. 7 is a quadruple camera configuration of a system.

Referring now to FIG. 6, a movement enhanced phase measurement profilometry (MPMP) based inspection endoscopic sensor system 600 is illustrated. A MPMP sensor 10" projects a sinusoidal pattern to facilitate the projector fabrication where defocusing is used to generate the sinusoidal pattern. The MPMP system 600 has an MPMP sensor 10" built and sized to suit the cylindrical environment inside the inspected pipe. The stereo setup of the cameras C 9one of which is shown in FIG. 6 are exploited to reduce the effect of perspective geometry on the 3D reconstruction without the need for regularization.

A phase-based system consists of a camera and a projector that projects a sinusoidal fringe on a scanned object. The 3D measurements of the object are obtained by comparing the phase on the scanned object surface with the phase on a predefined reference plane. FIG. 6 shows the projector P and a camera (C) that are separated by a distance B and at a distance (L) from a reference plane. S is a 3D point on the inspected surface, and Z is the distance from S to the reference plane. With the assumption that Z is much smaller than L, the relation can be written as:

$$Z \approx \frac{L}{B}d = \frac{L}{B}K\Delta\phi \qquad (13)$$

K is a system constant that relates to $\Delta\varphi$ on the reference plane. $\Delta\varphi$ is the difference between the phase on the reference plane and the scanned surface. Therefore, an accurate and precise phase retrieval for each scanned point represents the key for a successful 3D scanning. The intensity of each pixel in the acquired image is given by:

$$I = I' + I''\cos(\phi(x, h)) \tag{14}$$

l is the intensity of the camera pixel, I' is the ambient light intensity in addition to the DC component in the projected pattern, $I^{00}$ represents the modulated signal intensity and $\varphi$ is the phase on the scanned object. There are two main methods for $\varphi$ retrieval. The first method projects a single pattern and applies Fourier transform to the captured image to separate all the signal components. A bandpass filter is then applied to separate the modulated signal and convert it back by inverse Fourier transform. The phase is then evaluated by extracting the imaginary component after taking the logarithm of the inverted data. This method is fast and simple and requires only a single frame for reconstruction which means the real-time acquisition of the data is achievable. The drawbacks of this method appear in the reconstruction of sharp edges and holes that cause sharp changes in the carrier frequency. Another issue is the effect of the ambient light that makes it difficult to separate the modulated carrier. The second method is to project a sequence of patterns to reconstruct the phase from every single pixel separately. The system projects a sequence of N phase-shifted patterns with a phase difference of $\theta$ between every two consecutive frames. Where $\theta$ in most of the algorithms equals $2\pi/N$ or $2\pi/(N+1)$ to provide a more averaging effect. From those N phase-shifted patterns, the phase of the imaged points can be estimated and calculated.

The phase is then subtracted from the phase of a known reference plane to calculate the depth of the scanned object in a similar way to the Fourier transform-based method.

In a multi-shot PMP system, the projected pattern is shifted while the scanning platform is fixed. The pattern is shifted digitally to create a precise shift in the phase of the pattern projected on the surface of the inspected object. The intensity of the projected pattern on the scanned object is given by:

$$I_n = I' + I''\cos\left(\phi + \frac{2n\pi}{N}\right), n = 0, 1, 2 \ldots N - 1 \tag{15}$$

where $1_n$ is the intensity of the camera pixel for shifted fringe, I' is the ambient light intensity, and I'' is the modulation signal intensity. One of the popular schemes is to project four frames with a phase shift of $2\pi/4$ between each of them and can be represented as follows $$I_1 = I' + I''\cos(\phi + 0) = I' + I''\cos(\phi) \tag{16}$$

$$I_2 = I' + I''\cos(\phi + \pi/2) = I' + I''\sin(\phi)$$

$$I_3 = I' + I''\cos(\phi + \pi) = I' + I''\cos(\phi)$$

$$I_4 = I' + I''\cos(\phi + 3\pi/2) = I' + I''\sin(\phi)$$

By assuming a constant ambient light during the scanning process, the phase ($\varphi$) measured from each imaged point is given by:

$$\phi(x, y) = \arctan\left(\frac{I_2 - I_4}{I_1 - I_3}\right) \tag{17}$$

The Arctan function produces a wrapped phase that ranges between $-\pi$ and $\pi(\varphi=\phi \bmod(2))$. The absolute phase is then calculated by adding multiple of $2\pi$ to the calculated phase in a process called phase unwrapping.

In the MPMP, the scanning system moves along the pipe's main axis while projecting a static fringe pattern on the pipe's inner wall. This movement causes the projected pattern to be shifted by a distance dx resulting in a phase shift ($\Delta\varphi$) that is dependent on the height of the scanned object. In this system, each frame is given by:

$$I_n = I^0 + I^{00}\cos(\varphi + \theta(dx, h)), \tag{18}$$

where $\theta(s_n, h)$ is the phase shift created by the movement of the scanner for a distance of dx.

The height-dependent phase results is an oscillatory pattern on the surface of the scanned object that degrades the quality of the reconstruction.

In example, we use an active stereo approach to avoid nonlinear oscillations. The depth information is extracted by triangulating the disparity in the position of the observed objects in the two camera frames. Active stereo vision also eliminates the need for projector calibration by incorporating an additional stereo camera. This type of system uses the projector to provide the texture to the scanned object surface while the matching process depends on the disparity between the two cameras only. That is, there is no need to know the projector's intrinsic and extrinsic parameters. The system only requires a stereo camera calibration to calculate the relation between the two stereo cameras and their intrinsic parameters, which is a relatively easy process when compared to projector calibration. This framework also eliminates the requirement for linear phase projection and uniform scanned surface color. The stereo cameras are used to acquire an initial rough estimation of the imaged surface, and then the phase is used to refine the initial 3D structure of the inspected object. In this framework, a unique wrapped phase within $2\pi$ is assumed.

Figures 8A, 8B:
FIG. 8A is projected pattern used in a MPMP system with a nonlinearly distributed phase on the pipe internal walls.
FIG. 8B is a projection of a nonlinearly distributed phase on the interior walls.

Referring now to FIGS. 1A and 8A, the design set forth in FIG. 1A or the sensor design illustrated in FIG. 7 may be implemented in an MPMP system. For FIG. 1A, the design consists of the camera C and the projector P pointing in the same direction. The projector P is chosen to have a relatively narrow field of view (76 degrees in the present example) to project the image in front of the camera while the camera is chosen to have a much wider field of view (170 degrees in our design). Rectangular structured light setup can be modified to scan the cylindrical geometry inside the pipe by placing a light module in series with a camera that is pointing in the same direction as shown in FIGS. 1A and 1B. The triangulation process in the geometry at a specific angle ($\theta$) is explained in FIG. 1B. For a general camera model, it is defined by $f_p/Z=r_p/X$ and $f_c/(z-d)=r_c/X$. By combining the two equations, the coordinate of the point is extracted as:

$$Z = \frac{d}{1 - \frac{f_c r_p}{f_p r_c}} \text{ and } X = \frac{r_p Z}{f_p} \Bigg)$$ (19)

Projecting a pattern with a linearly changing phase results in a nonlinearly distributed phase on the pipe internal walls as shown in FIG. 8A. The nonlinear distribution arises from the nonlinear relation between the distance from the camera and the change in the camera coordinates according to the camera equation. Nonlinear distribution of the phase along z causes different phase changes for each projected point when the system moves inside the pipe. Therefore, the phase change relationship in the rectangular domain will not valid. This problem is mitigated by projecting a pattern with nonlinearly distributed phases on the interior walls of the pipe as shown in FIG. 8B.

In this design of FIG. 7, multiple cameras are directed at different portion of the cylindrical wall 12A. Cameras C3 and C4 are directed at an angle perpendicular to the longitudinal axis in a radial direction. Likewise, Cameras C5 and C6 are directed in an opposite (180 degree) direction from camera C3 and C4. The cameras C3-C4 cover different parts of the field of view while a single projector is used to illuminate the scene. This design offers the following advantages:

The complexity of the design is reduced by using only a single light projector.

Figures 9A, 9B:
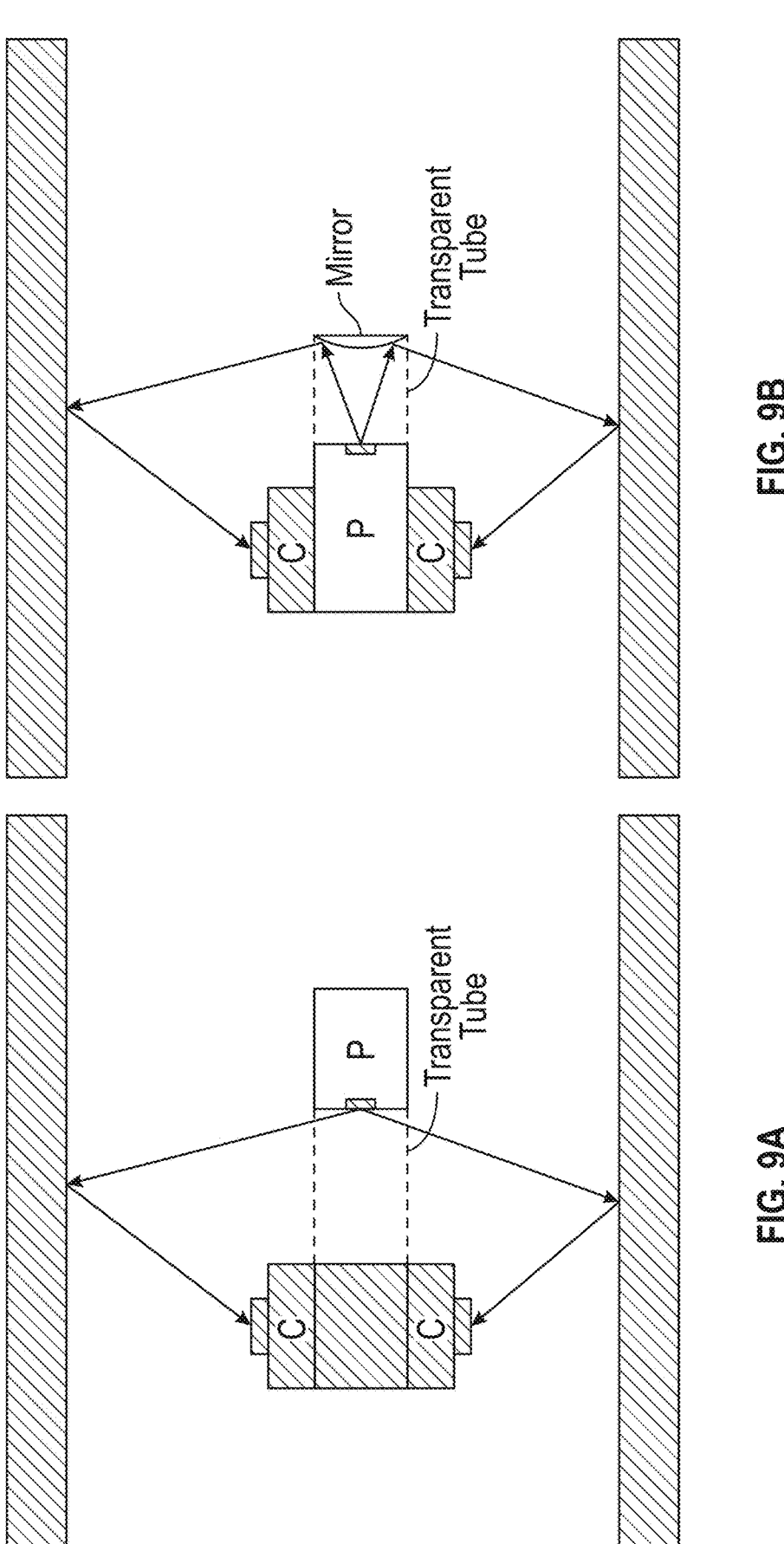
FIG. 9A is direct implementation of the sensor illustrated in FIG. 7.
FIG. 9B is a backward-looking projector implemented in the system of FIG. 7.

FIGS. 9A and 9B show a direct implementation of a simplified version of FIG. 7 called a direct implementation and FIG. 9B is a backward-looking projector with a spherical mirror. Resolution of the projection system is not critical since lens defocusing is used in the system as a low pass filter to produce the needed sinusoidal fringes. Further the need for very wide-angle projection lenses is eliminated which allows better control over the lens distortion. The distortion from using multiple projectors on the edges of the frame is also eliminated.

A direct implementation of the model in this design is explained in FIG. 9A. One of the drawbacks of this model is the wire connection needed to power the slide projector and the limited depth of field of the projection lens. The problem of the connections can be solved by coating the power connections on the surface of the transparent glass tube by using plasma sputtering. Another solution is based on using a projector coupled with a mirror to create a backward-looking projector as shown in FIG. 9B. This type of projector offers the advantages of eliminating the need for the sputtering process needed to power the projector and reducing the total size of the projector since the projector hardware can be embedded beneath the stereo cameras.

In this section an automatic procedure to electronically stabilize the acquired 3D frames is set forth. The algorithm exploits the geometry constraints from the cylindrical shape of the scanned pipe to estimate the orientation of the sensor inside the pipe. This stabilization algorithm is designed to reduce the effect of the continuous change in the orientation of the sensor when mounted to a moving robotic platform. The sensor is designed to be attached to a scanning platform that moves along the pipe during the 3D imaging process. Every single frame produces a sparse reconstruction of the pipe surface with a density that is dependent on the number of projected rings. In an ideal situation, the sensor is assumed to be in the middle of the pipe and always pointing in the direction of the scanning platform movement (parallel to the pipe main axis in the z-direction). In this case, the reconstructed 3D frames can be stacked sequentially by only adding a displacement in the z-direction that is dependent on the scanner speed at the time of acquisition. Experimentally, this assumption is not practical because it is difficult to maintain the sensor to be located exactly in the middle of the pipe and pointing in the forward direction. In this section, an algorithm is developed to estimate both the orientation of the sensor and its position inside the pipe for each acquired frame. The algorithm estimates the center of the reconstructed surface and the orientation of its principal axis. An ellipsoid is fitted to the point cloud to estimate its orientation with the assumption that the scanned pipe has a smooth surface with no large defects. The ellipsoid model was employed to improve the algorithm robustness toward cases of deformation in the shape of the inspected pipe like a pipe with an oval shape or a pipe with a small dent. The model can also handle errors from the calibration process which can result in producing a 3D profile with an oval shape. The general equation of a conic is given by:

$$Ax^2 + By^2 + Cz^2 + 2Dxy + 2Exz + 2Fyz + 2Gx + 2Hy + 2Iz + J = 0$$ (20)

In a matrix form, Eq. 20 can be written as:

$$x^T Q_{X=0}$$ (21)

$$x^T = (x, y, z, 1), X = \begin{pmatrix} x \\ y \\ z \\ 1 \end{pmatrix}, Q = \begin{pmatrix} A & D & E & G \\ D & B & F & H \\ E & F & C & I \\ G & H & I & J \end{pmatrix}.$$

For an ellipsoid, the constraint is $4J-I^2>0$, where $I=A+B+C$, and $J=AB+BC+AC-D^2-E^2-F^2$. In our case, a less strict linear constraint of $A+B+C=1$ was sufficient. After applying the constraint, Eq. 20 can be written as follows:

$$F(X, a) =$$ (22)
$$Xa = A(x^2 - z^2) + B(y^2 - z^2) + 2Dxy + 2Exz + 2Fyz + 2Gx + 2Hy + 2Iz + J = -z^2$$

In a matrix form, we have the following problem:

$$X_{a=b}$$ (23)
$$X = (x^2 - z^2, y^2 - z^2, 2_{xy}, 2_{xz}, 2_{yz}, 2_x, 2_y, 2_Z, 1)$$
$$a = (A, B, D, E, F, G, H, I, J)^T, b = -z^2$$

To Estimate a, we Minimize the Sum (s)

$$s = \sum_{i=1}^{N} (F(X, a) - b)^2$$ (24)

$$a = (X'X)^{-1} X'b.$$ (25)

$X_m$ has a dimensions of N by 9, a has a dimension of 9 by 1, and b has a dimension of N by 1.

After calculating the ellipsoid parameters, the center of the ellipsoid c can be calculated as follows:

$$c = \begin{pmatrix} x_0 \\ y_0 \\ z_0 \end{pmatrix} = \begin{pmatrix} A & D & E \\ D & B & F \\ E & F & C \end{pmatrix}^{-1} \begin{pmatrix} G \\ H \\ I \end{pmatrix}. \tag{26}$$

The principal axes of the ellipsoid are estimated by calculating the eigenvectors and eigenvalues of Q. Where the eigenvectors represent the directions of the main axes, while the eigenvalues represent the amount of the ellipsoid's stretch in each of the three axes. To restore the reconstructed pipe section to the correct alignment, the center of rotation is estimated, shifted to the origin (origin=(0,0)), and counter-rotation is applied. The center of rotation is calculated by estimating the intersection point between the pipe principal axis and the plane z=0. Counter rotation is then applied by multiplying the point cloud data by the rotation matrices as follows:

$$D_c = R_x R_y D, \tag{27}$$

$$R_x = \begin{pmatrix} 1 & 0 & 0 \\ 0 & \cos(\theta_x) & -\sin(\theta_x) \\ 0 & \sin(\theta_x) & \cos(\theta_x) \end{pmatrix},$$

$$R_y = \begin{pmatrix} \cos(\theta_y) & 0 & \sin(\theta_y) \\ 0 & 1 & 0 \\ -\sin(\theta_y) & 0 & \cos(\theta_y) \end{pmatrix},$$

where D represents the original data, $D_c$ represents the data after correction, and the $\theta_x$, and $\theta_y$ are the rotation angles around the x and y axes respectively.

Figure 10:
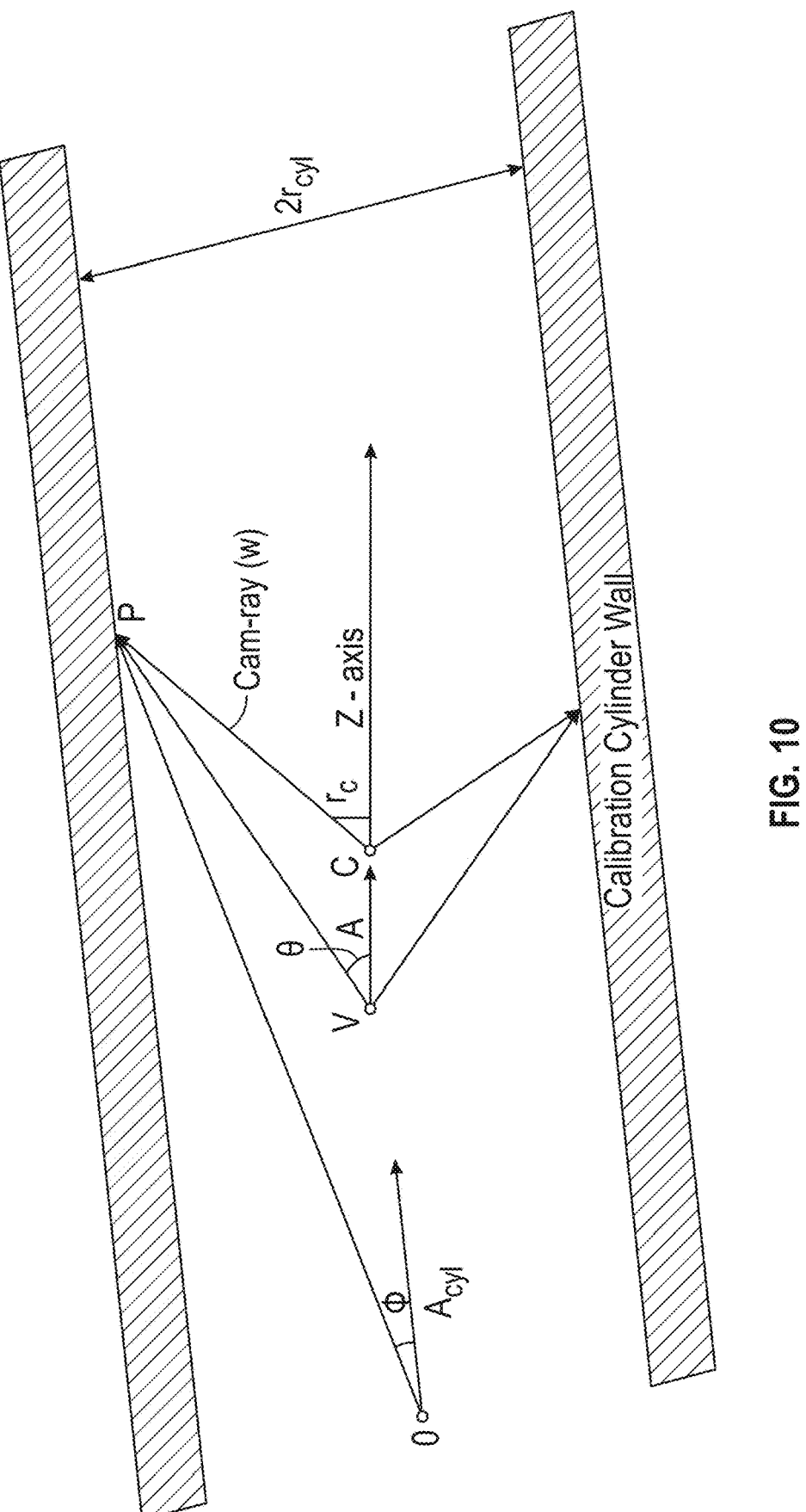
FIG. 10 is an environment for automatically calibrating the sensor system.

Referring now to FIG. 10, an automatic calibration algorithm to simplify the projector calibration process, reduce sensor downtime and ensure accurate calibration parameters before each inspection process is set forth. In this algorithm, a set of frames are collected at different orientations inside the pipe before each scanning process. The collected frames are then used to estimate the projector's intrinsic parameters and the stereo parameters between the projector and the camera. The calibration frames can be collected from inside a calibration tube with a known diameter or a service pipe that is known to be defect-free. Theoretically, any cylindrical pipe with prior knowledge of diameter would work without considering associated measurement uncertainties.

The calibration environment relative to FIG. 10, where a structured light sensor is enclosed by a cylinder with a radius $r_{Cyl}$ along an arbitrary axis $A_{Cyl}$. In this environment, without loss of generality, the camera is located at the origin (0,0,0) of the coordinate system, and the camera is pointing along the z-axis. The main goal here is to generate a set of 3D points to serve as an input to the calibration process; therefore, direct images with structured light patterns are acquired from inside a pipe with known diameter. The structured light pattern edges are segmented, decoded, and then converted to homogeneous coordinates to create a set of camera rays with known orientations. From FIG. 10, a set of camera rays (w) that originate from the origin of the coordinate system toward the cylinder walls is set forth. A projected cone originates from an arbitrary point (V) behind the origin. An infinite bounding cylinder with arbitrary orientation ($A_{Cyl}$) and known radius ($r_{Cyl}$) is illustrated. An Intersection points between the camera ray, cone, and the bounding cylindrical surface 12A.

The camera rays intersect with both the projected cone from the projector module and the surface 12A of the bounding cylinder; therefore, the intersection points belong to both the cylinder and the cone surfaces. The intersection point between the camera ray and the cone surface can be calculated by substituting the ray equation into the cone equation.

An infinite cylinder ($D_{arb}$) with an arbitrary orientation can be described as a cylinder (D) that is rotated by a rotation matrix (R) and shifted by a translation vector (T)

$$D_{arb=RD+T,\, R=R_xR_yR_z,} \tag{28}$$

$$R_x = \begin{pmatrix} 1 & 0 & 0 \\ 0 & \cos(\phi_x) & -\sin(\phi_x) \\ 0 & \sin(\phi_x) & \cos(\phi_x) \end{pmatrix},$$

$$R_y = \begin{pmatrix} \cos(\phi_y) & 0 & \sin(\phi_y) \\ 0 & 1 & 0 \\ -\sin(\phi_y) & 0 & \cos(\phi_y) \end{pmatrix},$$

$$R_z = \begin{pmatrix} \cos(\phi_z) & -\sin(\phi_z) & 0 \\ \sin(\phi_z) & \cos(\phi_z) & 0 \\ 0 & 0 & 1 \end{pmatrix},$$

R is a 3×3 orthogonal matrix and T is 3×1 column vector. $R_x$, $R_y$, $R_z$ are 3×3 rotation matrices describing the rotation around x, y, and z respectively. $\varphi_x$, $\varphi_y$, $\varphi_z$ are the rotation angles around x, y, and z respectively. Therefore, D can be described by $$D = R^T(D_{arb} - T), \tag{29}$$

and any point on the surface of D satisfies $$\sqrt{D_x^2 + D_y^2} = r_{Cyl}, \tag{30}$$

where $D_x$ and $D_y$ are the x and y components of D. Since an infinite cylindrical surface is assumed, there is no need to estimate the rotation around the z-axis or the shift along the z-direction. Therefore, the number of parameters is reduced from six to four and the algorithm only needs to estimate $\varphi_x$, $\varphi_y$, Tx, and $T_y$.

To estimate the calibration parameters, we followed two approaches. The first approach is a direct approach where the algorithm minimizes the difference between the calibration pipe radius ($r_{Cyl}$) and the estimated radius ($\tilde{r}_{Cyl}$) from the estimated points from the ray cone intersection. The optimization problem is given by $$\hat{\theta}, \tilde{A}, \hat{V}, \hat{\phi}_x, \hat{\phi}_y, \hat{T}_x, \hat{T}_Y, = \operatorname{argmin}\left(\|(r_{Cyl} - \tilde{r}_{Cyl}\|_2^2\right) \tag{31}$$

The value of ($\tilde{r}_{Cyl}$) is calculated by using Equation 30. This cost function provides a fast method for quickly calculating an initial estimate of the calibration parameters. Still, it cannot offer a unique solution because it is not aware of the error in estimating the z-coordinates and is only affected by the error in the radius of the estimated cylinder. Simulations showed that this method provides a fast estimate of the initial point if proper constraints for the V are used. Therefore, the method can accelerate the solution by calculating a point close to the minima to serve as an input for the second approach.

In the second approach, the algorithm follows the optical path Camera-Cylinder-Cone-Camera. The image points $D_{im}$ are converted to homogeneous coordinates first, and the ray-cylinder intersection algorithm RCyl is used to find the intersection points $D_{RC}$ between the camera rays and the cylinder. The cylindrical surface rays passing through the generated 3D points are then used to calculate the intersection points $D_{CC}$ between the cylinder and the projected cone. The cylinder surface rays $Ray_{Cyl}$ are described by $$Ray_{Cyl} = D_{RC} \,|\, sA_{Cyl}, \qquad (32)$$

where $A_{Cyl}$ is a unit vector describing the direction of the cylinder main axis and s is an arbitrary scaler. The estimated camera points $D_c$ are then created by projecting $D_{CC}$ from the 3D space to image coordinates with a pinhole camera model (PHM). With both the input data and estimated data in the camera image domain, the minimization problem can be described by $$\theta, \tilde{A}, \tilde{V}, \tilde{\phi}_x, \tilde{\phi}_y, \tilde{T}_x, \tilde{T}_Y, = \mathrm{argmin}\big(\|(\|D_{im}\|_2 - \|D_C\|)_2\|_2^2\big) \qquad (33)$$

The function minimizes the difference in the distance from the image center because it is directly related to the difference in the projection angles between the projected and estimated cones $$\left(\theta = \arctan\left(\frac{\|D_{im}\|_2}{f_c}\right)\right).$$

A detailed description of the automatic calibration algorithm with a single ring projection is described in Algorithm 1. The operation CR in the algorithm refers to Equation 32, and NoF refers to the number of calibration frames.

---

Algorithm 1 Automatic calibration with a single ring $(\tilde{\theta}, \tilde{A}, V, \tilde{\phi}_x, \tilde{\phi}_y, \tilde{T}_x, \tilde{T}_y) = \mathrm{argmin}(\mathrm{CostFunc})$
procedure COSTFUNC $(\tilde{\theta}, \tilde{A}, V, \tilde{\phi}_x, \tilde{\phi}_y, \tilde{T}_x, \tilde{T}_y)$
    for i = 1 to $N_0$F do
        $D_{RC}$ = RCyl $(\tilde{\phi}_x(i), \tilde{\phi}_y(i), \tilde{T}_x(i), \tilde{T}_y$ (i), $D_{im})$
        $Ray_{Cyl}$ = CR $(D_{RC}, \tilde{\phi}_x(i), \tilde{\phi}_y$ (i) )
        $D_{CC}$ = RCoI $(Ray_{Cyl}, \theta, A, V)$
        $D_C$ = PHM$(D_{CC})$
        Err(i) = $\|D_C\|_2 - \|D_{im}\|_2$
    end for return $\| Err \|_2^2$ End procedure

---

Figure 11:
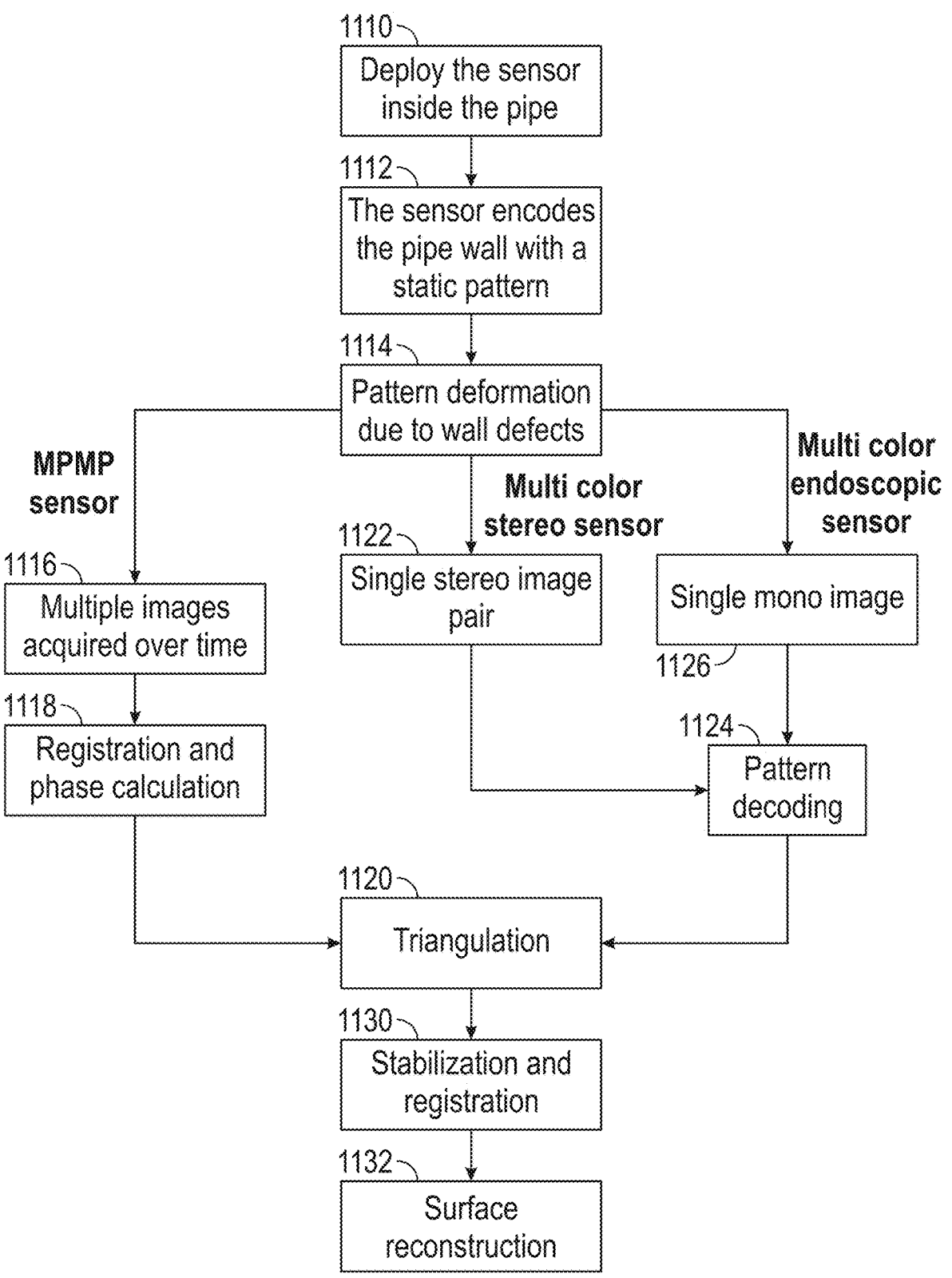
FIG. 11 is a high-level flowchart of a method for operating the system.

Referring now to FIG. 11, a general method for operating the system is set forth. Many of the details of the various steps are provided above. In step 1110, the sensor is deployed inside a pipe. The sensor may be deployed using an actuator 34 as described above. The sensor may also be deployed manually through the pipe. In step 1112, the sensor encodes the pipe wall with a static pattern. As mentioned above, the static pattern may be sinusoidal pattern or a multi-color pattern that corresponds to a predetermined code.

In step 1114, the pattern deforms due to the wall defects. As mentioned above, the defects may be detected using various types of sensors. In step 1116, multiple images are acquired over time as the sensor is deployed within the pipe. This is performed for MPMP sensor. The images are registered, and the phases are calculated as described above, which takes place in step 1118.

When the sensor is a multi-color stereo sensor, step 1122 is performed after step 1114. Step 1112 obtains the single stereo image pair.

Referring back to step 1114, the pattern deformation may take place due to wall defects and thereafter step 1126 is performed when a multi-color endoscopic type sensor is used. The single mono color image is obtained in step 1126.

After steps 1122 and 1126, the pattern is decoded in step 1124. Triangulation techniques take place after step 1118 and 1124 to determine the surface profile and determine when defects are present. In step 1130, stabilization and registration of the images take place. This allows a full picture of the inside of the cylinder to be obtained. In step 1132, a surface reconstruction using the triangulation in step 1120 and the stabilization and registration steps 1130 are used to obtain the surface reconstruction. By obtaining the surface profile reconstruction, defects may be determined by the controller 32.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An inspection tool comprising:
a transparent tube;
a first camera disposed in the transparent tube;
a projector disposed in the transparent tube projecting a projected pattern of light on a cylindrical surface through the transparent tube, the light intersecting the transparent tube at locations positioned longitudinally between the first camera and the projector, said light is incident on the cylindrical surface longitudinally after passing the first camera, said light is reflected from the cylindrical surface toward the first camera and is received by the first camera;
the first camera generating a first image of the projected pattern; and
a controller generating a surface profile of the cylindrical surface based on the first image.

2. The inspection tool as recited in claim 1 wherein the projector comprises a light source projecting light through a collimating lens, a slide comprising a slide pattern used to form the projected pattern and a projection lens for projecting the projected pattern.

3. The inspection tool as recited in claim 2 wherein the protected pattern comprises a plurality of rings.

4. The inspection tool as recited in claim 3 wherein the plurality of rings is multicolor.

5. The inspection tool as recited in claim 3 wherein the plurality of rings is separated by a null space.

6. The inspection tool as recited in claim 1 wherein the first camera comprises a CMOS camera.

7. The inspection tool as recited in claim 1 further comprising a second camera generating a second image of the projected pattern.

8. The inspection tool as recited in claim 7 wherein the second camera and the first camera are radially disposed.

9. The inspection tool as recited in claim 7 wherein the second camera and the first camera are axially disposed.

10. A method of inspecting a cylindrical surface comprising:
projecting a projected pattern of light on a cylindrical surface through a transparent tube, the light intersecting the transparent tube at locations positioned longitudinally between a first camera and a projector, said light is incident on the cylindrical surface longitudinally after passing the first camera;
reflecting the light from the cylindrical surface toward the first camera and receiving the light at the first camera;
generating a first image of the projected pattern; and
generating a surface profile of the cylindrical surface based on the first image.

11. The method of claim 10 wherein projecting comprises projecting light through a collimating lens and a slide comprising a slide pattern used to form the projected pattern; and projecting the projected pattern through a projection lens.

12. The method of claim 10 wherein projecting comprises projecting the protected pattern comprising a plurality of rings.

13. The method of claim 10 wherein projecting comprises projecting the protected pattern comprising a plurality of multicolor rings.

14. The method of claim 10 wherein projecting comprises projecting the protected pattern comprising a plurality of rings separated by a null space.

15. The method of claim 10 wherein generating the first image comprises generating the first image from a CMOS camera.

16. The method of claim 10 wherein generating the first image comprises generating the first image from a first camera and further comprising generating a second image of the projected pattern from a second camera.

17. The method of claim 10 wherein generating the first image comprises generating the first image from a first camera and further comprising generating a second image of the projected pattern from a second camera radially disposed with the first camera.

18. The method of claim 10 wherein generating the first image comprises generating the first image from a first camera and further comprising generating a second image of the projected pattern from a second camera axially disposed with the first camera.

* * * * *